United States Patent [19]

Fellows et al.

[11] Patent Number: 5,401,221
[45] Date of Patent: Mar. 28, 1995

[54] TRANSMISSION OF THE TOROIDAL-RACE, ROLLING-TRACTION TYPE HAVING A MIXER AND A REDUCER EPICYCLIC TYPE GEARING WITH CLUTCHES BRAKES

[75] Inventors: Thomas G. Fellows, Barnet; Geoffrey B. Soar, Croydon, both of England

[73] Assignee: Torotrak (Development) Limited, England

[21] Appl. No.: 983,580

[22] PCT Filed: Aug. 14, 1991

[86] PCT No.: PCT/GB91/01382

§ 371 Date: Feb. 4, 1993

§ 102(e) Date: Feb. 4, 1993

[87] PCT Pub. No.: WO92/03671

PCT Pub. Date: Mar. 5, 1992

[30] Foreign Application Priority Data

Aug. 17, 1990 [GB] United Kingdom ............... 9018082

[51] Int. Cl.⁶ ........................................... F16H 15/52
[52] U.S. Cl. ................................. 475/214; 475/216
[58] Field of Search ............... 475/192, 214, 215, 216, 475/219; 476/40

[56] References Cited

U.S. PATENT DOCUMENTS

| | | | |
|---|---|---|---|
| 3,277,745 | 10/1966 | Harned et al. | 476/19 |
| 4,464,952 | 8/1984 | Stubbs | 475/216 OR |
| 4,693,134 | 9/1987 | Kraus | 476/40 |
| 4,768,398 | 9/1988 | Greenwood | 475/216 OR |
| 4,872,371 | 10/1989 | Fellows | 476/40 |
| 5,020,384 | 6/1991 | Kraus | 475/216 X |
| 5,139,466 | 8/1992 | Perry | 476/40 |
| 5,213,011 | 5/1993 | Nobumoto et al. | 475/216 X |
| 5,230,670 | 7/1993 | Hibi | 475/216 X |
| 5,232,414 | 8/1993 | Fellows et al. | 475/216 |
| 5,238,460 | 8/1993 | Esaki et al. | 475/192 OR |

FOREIGN PATENT DOCUMENTS

| | | |
|---|---|---|
| 0149892 | 7/1985 | European Pat. Off. . |
| 0158411 | 10/1985 | European Pat. Off. . |
| 0177241 | 4/1986 | European Pat. Off. . |
| 0185463 | 6/1986 | European Pat. Off. . |
| 0306272 | 3/1989 | European Pat. Off. . |
| 957145 | 5/1964 | United Kingdom . |
| 1078791 | 8/1967 | United Kingdom . |
| 2033753 | 1/1980 | United Kingdom . |
| 2100372 | 12/1982 | United Kingdom . |
| 2150240 | 6/1985 | United Kingdom . |
| 9005864 | 5/1990 | WIPO ............... 475/214 |
| 90/07660 | 7/1990 | WIPO ............... 475/216 |

Primary Examiner—Dirk Wright
Assistant Examiner—Khoi Q. Ta
Attorney, Agent, or Firm—Davis, Bujold & Streck

[57] ABSTRACT

A continuously variable transmission with coaxial input (from 6) and output (17), capable of operating in at least two regimes, and having a variator (2) of the toroidal-race rolling-traction type, and gearing including both a speed reducing unit (10) and an epicyclic mixing gear unit (15) in which the components of the mixing gear unit are locked up in at least one of the regimes, and in which the speed-reducing unit (10) effects its speed-reduction without reversal of the direction of rotation between its input (1) and output (from 26). The operating axis (5) of the variator (2) may either coincide with the coaxial input and output of the transmission (FIG. 2) or be parallel to but displaced from it (FIG. 3). In addition to a brake (13) and a clutch (20), operable to engage first and second regimes, a further clutch (48) operable to engage a third regime is shown.

5 Claims, 2 Drawing Sheets

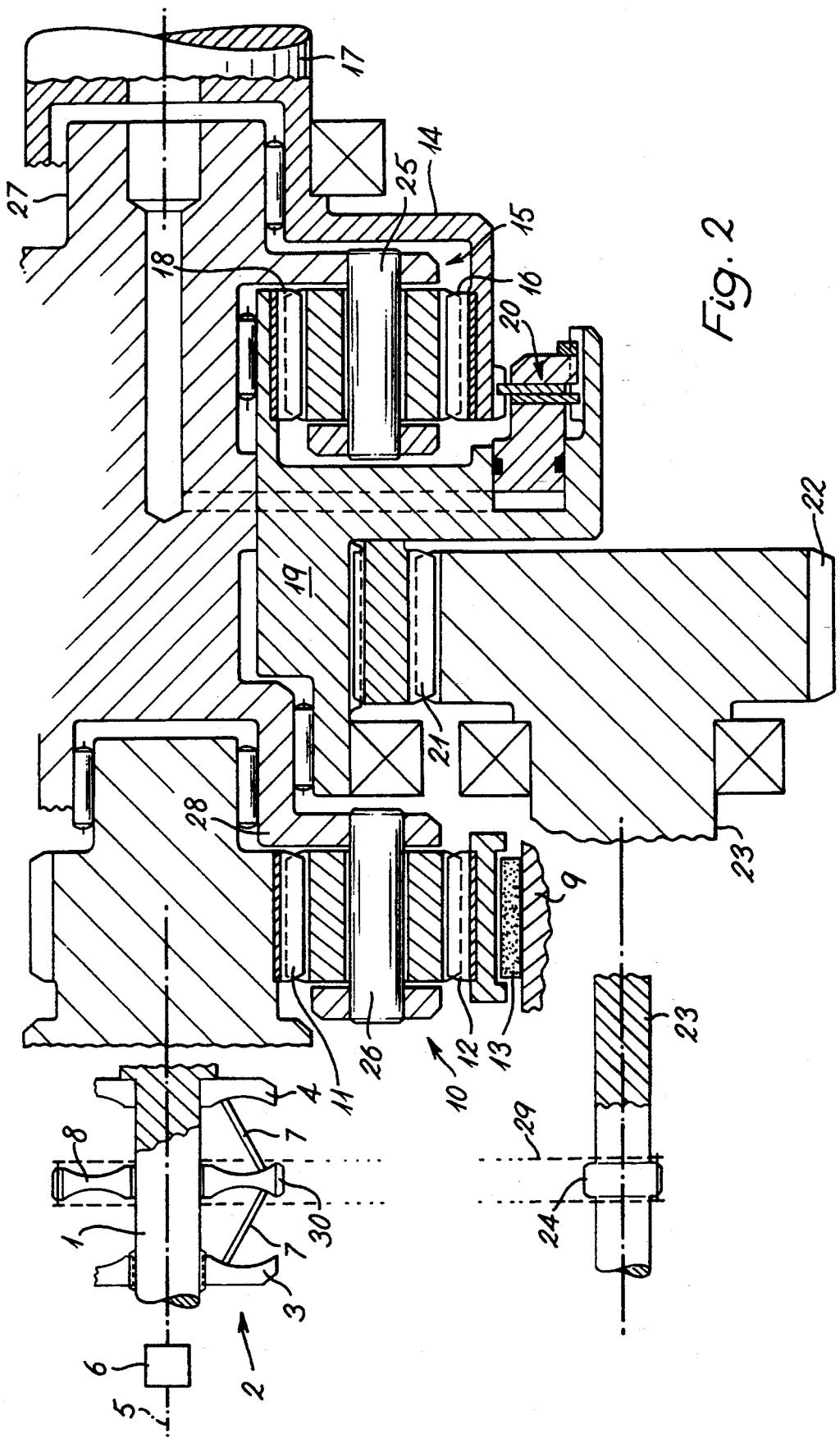

TRANSMISSION OF THE TOROIDAL-RACE, ROLLING-TRACTION TYPE HAVING A MIXER AND A REDUCER EPICYCLIC TYPE GEARING WITH CLUTCHES BRAKES

FIELD OF THE INVENTION

This invention relates to continuously-variable-ratio transmissions ("CVT's") of the toroidal-race rolling-traction type, capable of operating in more than one regime. It relates in particular to improvements in and modifications of the kind of CVT described in U.S. Pat. No. 5,232,414.

BACKGROUND OF THE INVENTION

FIG. 1 of the accompanying drawings is a schematic representation of the essential components and power flows in a typical two-regime CVT, in which change between regimes is made in a synchronous manner as well understood in the art. The output of engine E is connected both to the variator V, that is to say the ratio-varying component of the CVT, and also to a gearing unit G. The outputs of variator V and unit G constitute separate inputs to a gearing unit M, usually referred to as the "mixer" gear unit and of epicyclic type. Output O of unit M constitutes the output of the CVT. Controlled engaging devices G' and M' are associated with unit G and M respectively: devices G' and M' will be referred to as a brake and a clutch respectively, because that is what they are in several known transmissions.

The first of the two regimes in which the CVT is capable of operating is typically known as "low" regime. During this regime, brake G' is engaged and clutch M' open, so that the outputs of unit G and variator V drive two of the components of mixer M and the output O, taken from a third component, 1 s the resultant of the two inputs. Typically, with the CVT in low regime, a full sweep through the ratio range of variator V, beginning with the variator set to deliver high ratio, causes the speed of rotation of output O to progress from maximum reverse value through a state where O is at rest but the other components of units G and M are in motion and the CVT is said to be in "geared neutral", and then to rise in the forwards sense, reaching a relatively low value of forward speed when the variator V reaches the opposite—i.e. low—end of the ratio range to that at which it began. If the ratios of variator V and units G and M are appropriately chosen, and brake G' and clutch M' are respectively disengaged and engaged at this moment, the second or "high" regime may take over from low regime without any instantaneous change in the rotary speed of output O. Such a regime change is known in the art as a "synchronous change". Thereafter, if the ratio delivered by variator V is progressed back to the original end of its range, the forward velocity of output O increases steadily. At the moment of synchronous change, and throughout high regime, clutch M' "locks-up" mixer unit M, that is to say locks the three components of the epicyclic or like unit so that they rotate in unison. In high ratio the rotary speeds of output O and of the output of variator V are therefore the same, in both magnitude and direction, and unit G is inactive. FIG. 1 also indicates the power flows that take place within the CVT during forward motion in low regime. Assuming reasonable efficiency, power $P_o$ at output O will be approximately equal to the engine power $P_e$, but power will recirculate in the "loop" of units G, M and V much as indicated, the power in two of the connected limbs being greater than engine power by an increment δ, and the power in the remaining two limbs being equal to that increment. As is well understood in the art, if its to be possible to achieve a condition in which the three components of mixer unit M are locked up and so permit a synchronous change between low and high regimes, two conditions should be fulfilled. Firstly, the magnitude of the input from unit G to mixer unit M must be equal, both in magnitude and direction, to the input that it receives from variator V when that variator is at the low ratio setting at which synchronous change is made. Second, somewhere within the power recirculation loop, a reversal of rotation must be achieved, because there is a necessary reversal of direction between the input and output of a variator of the toroidal-race rolling-traction type, and the system must therefore include a further reversal of direction in order for the senses of rotation of the two inputs to the mixer unit M to be the same, as is necessary.

Hitherto it has been customary, in the art, to achieve both the reversal and the speed reduction within unit G itself. This happens, for instance, within the speed-reducing unit 107 shown in FIG. 4 of Patent Specifications GB-A-2023753, GB-A-2100372 and U.S. Pat. No. 4,297,918. The inevitable consequence of this combination of requirements has been to reduce somewhat the potential efficiency of unit G, which like unit M may be of epicyclic type, like item 107 in the two patent publications just recited.

BRIEF DESCRIPTION OF THE DRAWINGS

The present invention, includes CVT's substantially as described in the accompanying drawings, and will now be described by way of example with reference to the FIGURES of those drawings in which:

FIG. 2 is an axial section of the principle components of a CVT according to a first embodiment of the invention.

DETAILED DESCRIPTION OF THE INVENTION

Figure 1:
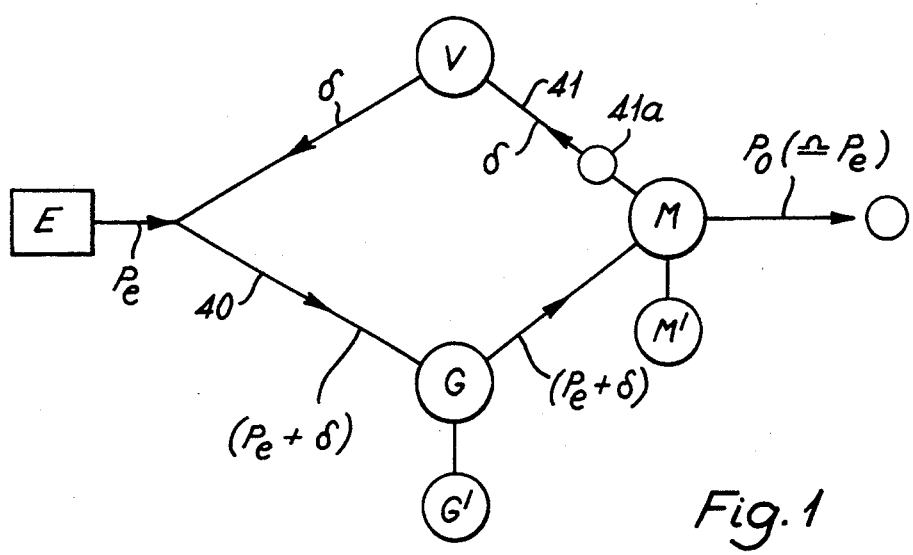
FIG. 1 is a schematic representation of a 2-regime CVT according to the invention.

One aspect of the invention is illustrated by FIG. 2 of this specification. In that CVT the two necessary features of the power recirculation loop that have just been referred to—namely, speed reduction and direction reversal—are separated, so enhancing the efficiency of the speed-reducing unit. Reference 10 indicates the simple epicyclic unit which corresponds to unit G of FIG. 1, and in which no direction-reversal takes place: the input to unit 10 from the prime mover 6, by way of the same shaft 1 which acts as the input member to the variator 2, corresponds to limb 40 of the power recirculation path of FIG. 1. The necessary reversal relative to engine direction, which must be present in the input to the mixing epicyclic 15, comes instead by way of the connection of that unit to the output disc 8 of the variator: disc 8 is connected to layshaft 23 by way of a chain 29, so avoiding any change in rotary direction, but layshaft 23 and the sun gear 18 of unit 15 are connected by way of the engagement of gears 22 and 21, so that direction is reversed, at a location—indicated schematically by reference 41a—within limb 41 of the diagram of FIG. 1.

Figure 3:
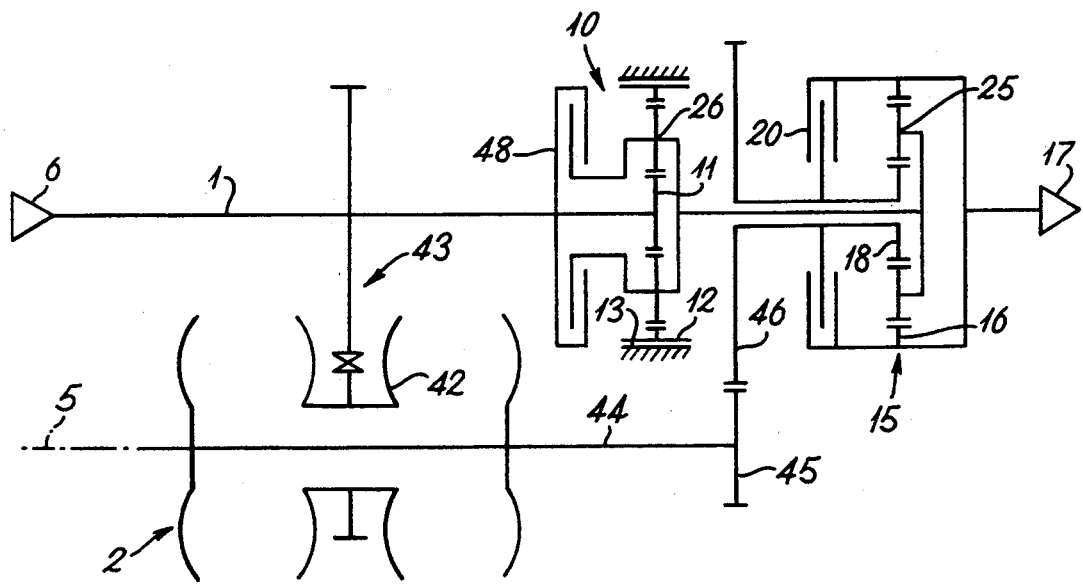
FIG. 3 is a diagrammatic axial section of the principle components of a CVT according a second embodiment of the invention.

FIG. 3 of the drawings is a diagrammatic axial section through the principal components of another CVT falling within the scope of the present invention and items with counterparts in FIG. 2 are identified by the same reference numerals. Prime mover 6, variator 2, reduction gear unit 10 and brake 13, mixing epicyclic gear unit 15 and clutch 20, and output shaft 17 are present as in FIG. 2. In FIG. 3 the operating axis 5 of variator 2 no longer coincides with the common axis of prime mover 6 and output shaft 17, is was the case in FIG. 2, but is displaced from and parallel to it. However, the reversal of direction that is necessary for one of the inputs to mixing unit 15 is again obtained in limb 41 of the power recirculation path, and not within gear unit 10. In FIG. 3 the central input member 42 of variator 2 is driven without reversal of direction from input shaft 1 by way of a chain connection 43, but the output shaft 44 of the variator drives sun 18 of unit 15 with direction reversal by way of meshing gears (45 and 46) as before.

FIG. 3 also illustrates another aspect of the present invention, according to which a CVT as already described may be simply adapted so as to be capable of operating in a third regime which is specially suited to high speed cruising and thus in effect adds an overdrive. A clutch 48 is provided by which input shaft 1 may be coupled directly to the output member, that is to say the planet carrier 26, of speed-reduction unit 10. As before, in first or "low" regime brake 13 is engaged and clutch 20 disengaged: clutch 48 will be disengaged also. In second or "high" regime clutch 20 will be engaged and brake 13 disengaged, and clutch 48 will again be disengaged also. To change from high to third—or "overdrive"—regime, clutch 20 is disengaged and clutch 48 engaged, and brake 13 remains disengaged. In order to achieve the maximum possible extension of the output speed of the transmission, the change between high and overdrive regimes will typically be made at the extreme end of the variator ratio range which is opposite to that at which the synchronous change between low and high regimes was made. Therefore the ratio reduction obtained in the half of the recirculation path including variator V and limb 41 (FIG. 1) must be equal to the "overdrive" ratio of the variator, and the reduction in the other half of the path (including unit G and limb 40) must be equal to the product of the overdrive and reduction ratios of the variator, that is to say to the total ratio range of the variator, which is typically from 1:2 to 2:1, i.e. a total range of 4:1.

Since the mixing gear unit 15 has been operating in "locked-up" state throughout high regime, it must be in that state when the change to overdrive regime is made: the change must therefore be synchronous also. In overdrive regime, with clutch 48 engaged but brake 13 and clutch 20 disengaged, sun 18 of mixing gear unit 15 will be driven, as in low regime, by the output of variator 2 and with reversal of direction by way of gears 45 and 46. Planet carrier 25 of unit 15 will now be driven directly at engine speed, without the speed reduction that unit 10 provided in low regime. The resultant of these two inputs will, as in low regime, be transmitted to the output shaft 17 by way of the annulus gear 16.

Assuming the following quantities:
A ratio range of the variator from 1:2 to 2:1;
A 1.5:1 step-up in ratio from input shaft 1 to variator input disc 42, due to chain 43:
A 1:3 reduction in rotary speed from variator output shaft 44 to sun 18, due to gears 45, 46;
An annulus: sun ratio of 3:1 for speed-reducing epicyclic gear unit 10, and
An annulus: sun ratio of 2:1 for mixing epicyclic gear unit 15,
the following ranges of speed for output shaft 17 are obtained:
Low regime
Reverse $-\frac{1}{8}$ engine speed
Forward $\frac{1}{4}$ engine speed
High range
Low $\frac{1}{4}$ engine speed (synchronous change from low range)
High 1 engine speed (synchronous change to overdrive range)
Overdrive range
Low 1 engine speed (synchronous change from high regime)
High $1\frac{3}{8}$ engine speed.

Overdrive range would typically be used for high speed cruising, and should provide a useful ratio span, in that context, of 1.375:1 (i.e. not unlike conventional 5th and 6th gears). Moreover, the variator power in this range would typically vary between 50% of the total at the low end and 9% at the high end. Overall efficiency should therefore be high, and the life penalty of continuous operation small. A CVT with such a third and highest regime is therefore potentially suitable for vehicles like coaches and trucks which must be able to climb shallow and steep gradients, negotiate city streets and crawl in traffic jams—all conditions for which a transmission with continuous variation of ratio is suitable—but must also be able to spend long hours at steady speeds and therefore have transmissions that operate very efficiently for such duty.

We claim:

1. A CVT (continuously-variable-ratio transmission) having a coaxial input (from 6) and output (17) and that selectively operates in at least first and second regimes, said CVT comprising in combination:
   a toroidal-race rolling-traction type ratio-varying variator (2) having an operating axis (5) that is coaxial with the input and output of the CVT, and
   a gearing arrangement comprising both a speed reducing gear unit (10) and a mixing epicyclic type gear unit (15),
   wherein the mixing epicyclic type gear unit includes first engagement means (20) that selectively locks the mixing epicyclic type gear unit components (18, 25, 16) so that they rotate as one in at least one of the first and second regimes, and so that a direction of rotation of an output member (26) of the speed reducing gear unit (10) and an input (1) of the speed-reducing gear unit are the same.

2. A CVT (continuously-variable-ratio transmission) having a coaxial input (from 6) and output (17) and that selectively operates in at least first, second and third regimes, said CVT comprising in combination a toroidal-race rolling-traction type ratio-varying variator, and a gearing arrangement comprising both a speed reducing gear unit (10) and a mixing epicyclic type gear unit (15),
   wherein the mixing epicyclic type gear unit includes first engagement means (20) that selectively locks the mixing epicyclic type gear unit components (18, 25, 16) so that they rotate as one in at least one of the first and second regimes, and so that a direction of rotation of an output member (26) of the speed reducing gear unit (10) and an input (1) of the speed-reducing gear unit are the same; and second (13) engagement means are associated with the reducing gear unit, in that the second and first engagement means respectively and selectively engage the CVT in first and second regimes, and in that a third engagement means (48) selectively engages the CVT in a third regime.

3. A CVT according to claim 2 wherein the third engagement means is a clutch that selectively connects the engine output (from 6) directly to the output member (26) of the reducing gear unit (10).

4. A CVT according to claim 3 wherein the reducing gear unit is of an epicyclic type and the output member of the reducing gear unit is a planet carrier.

5. A CVT (continuously-variable-ratio transmission) having a coaxial input (from 6) and output (17) and that selectively operates in at least first and second regimes, said CVT comprising in combination:
- a toroidal-race rolling-traction type ratio-varying variator (2) having an operating axis (5) that is displaced from but parallel to the common axis of the input and output of the CVT, and
- a gearing arrangement comprising both a speed reducing gear unit (10) and a mixing epicyclic type gear unit (15), wherein the mixing epicyclic type gear unit includes first engagement means (20) that selectively locks the mixing epicyclic type gear unit components (18, 25, 16) so that they rotate as one in at least one of the first and second regimes, and so that a direction of rotation of an output member (26) of the speed reducing gear unit (10) and an input (1) of the speed-reducing gear unit are the same.

* * * * *